United States Patent
Orschulik

(10) Patent No.: US 7,690,150 B2
(45) Date of Patent: Apr. 6, 2010

(54) PLANTER

(75) Inventor: Günther Orschulik, Holdorf (DE)

(73) Assignee: Poeppelmann Holding GmbH & Co. KG, Lohne (DE)

(*) Notice: Subject to any disclaimer, the term of this patent is extended or adjusted under 35 U.S.C. 154(b) by 518 days.

(21) Appl. No.: 10/521,399

(22) PCT Filed: Jun. 18, 2003

(86) PCT No.: PCT/EP03/06428

§ 371 (c)(1), (2), (4) Date: Jul. 8, 2005

(87) PCT Pub. No.: WO2004/006651

PCT Pub. Date: Jan. 22, 2004

(65) Prior Publication Data

US 2006/0037241 A1    Feb. 23, 2006

(30) Foreign Application Priority Data

Jul. 16, 2002    (DE) .............................. 202 10 788 U

(51) Int. Cl.
*A01G 9/04*    (2006.01)
(52) U.S. Cl. ................. 47/66.1; 47/71; 47/79
(58) Field of Classification Search ................. 47/65.5, 47/66.1, 68, 67, 71, 65, 65.6; D11/142, 143, D11/152–156; *A01G 9/02, 9/04*
See application file for complete search history.

(56) References Cited

U.S. PATENT DOCUMENTS

| 1,391,353 A | * | 9/1921 | Wells | 47/71 |
| 2,605,588 A | * | 8/1952 | Lindstaedt | 47/79 |
| 3,949,524 A | * | 4/1976 | Mickelson | 47/79 |
| 3,981,099 A | * | 9/1976 | Dziewulski | 47/67 |
| 3,987,584 A | * | 10/1976 | Yellin | 47/71 |
| 4,167,080 A | * | 9/1979 | Mickelson | 47/71 |
| 4,224,764 A | * | 9/1980 | Dziewulski et al. | 47/71 |
| 4,299,055 A | * | 11/1981 | Dziewulski et al. | 47/71 |
| 4,308,690 A | * | 1/1982 | Klein | 47/79 |
| 4,315,382 A | * | 2/1982 | Kay et al. | 47/71 |
| 4,739,581 A | * | 4/1988 | Jarvis | 47/71 |
| 5,397,382 A | * | 3/1995 | Anderson | 96/135 |
| 5,727,347 A | * | 3/1998 | Sellers | 47/67 |
| 5,743,045 A | * | 4/1998 | Hicks | 47/71 |
| 5,806,241 A | * | 9/1998 | Byland et al. | 47/81 |

(Continued)

FOREIGN PATENT DOCUMENTS

DE    3728621    *    5/1998

(Continued)

*Primary Examiner*—Rob Swiatek
*Assistant Examiner*—Kristen C Hayes
(74) *Attorney, Agent, or Firm*—Porter, Wright, Morris & Arthur, LLP

(57) ABSTRACT

A plant container with a pot and a coaster (2) made of plastic, in particular as a flowerpot, whereby the coaster (2) which is closed at the bottom to serve as a water dish is to be attached undetachably via coupling devices to the pot (1) which is provided with holes at the bottom and is designed in the sense of an easy but secure connection of the pot and the coaster in such a manner that the coaster (2) and the pot (1) are interconnected via coupling elements (11, 15) by at least one conically tapering guide face (9, 16) and are mutually engaged by a rotational movement.

15 Claims, 5 Drawing Sheets

U.S. PATENT DOCUMENTS

Figure 1:
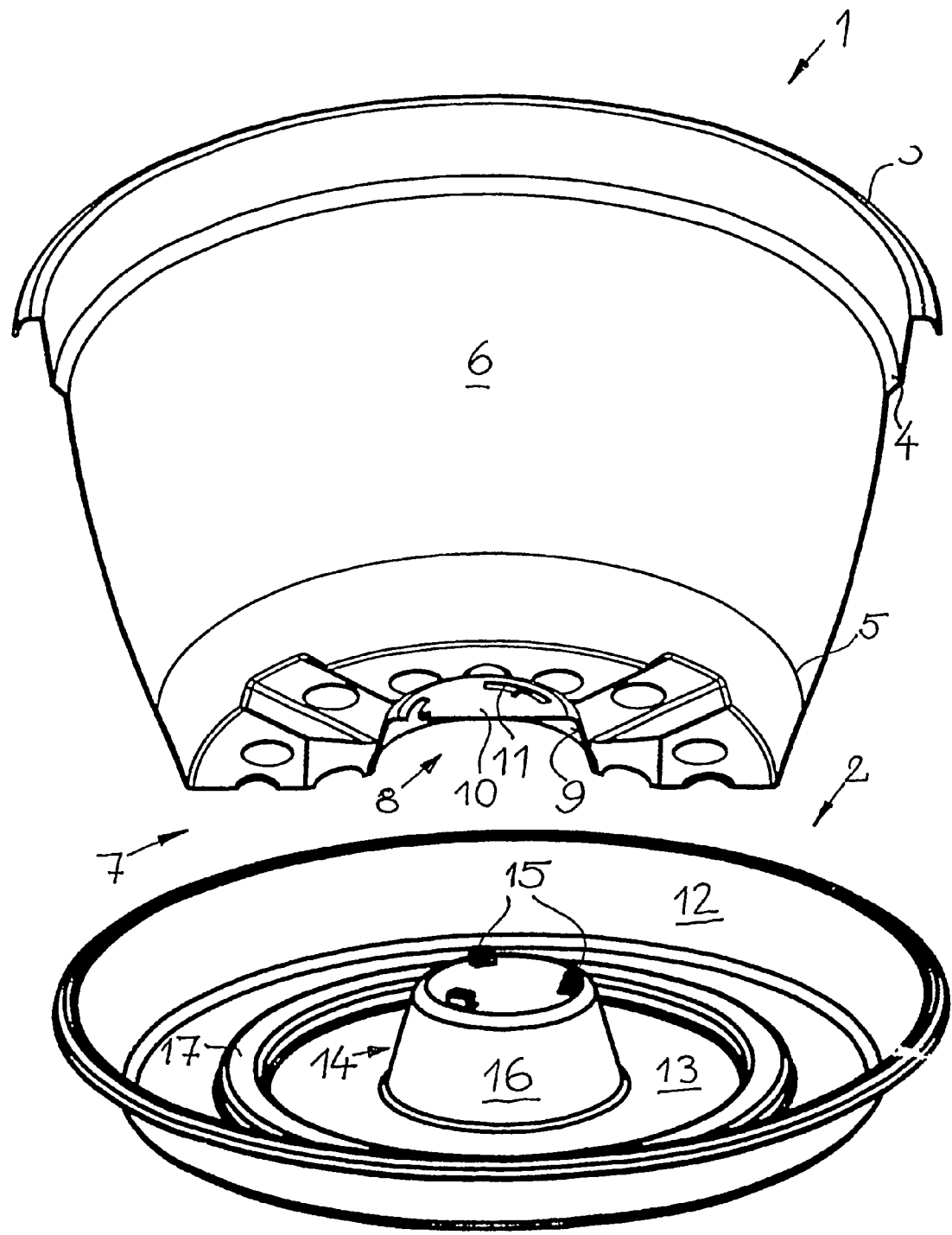

| | | | | |
|---|---|---|---|---|
| 5,870,855 A | * | 2/1999 | Hougaard | 47/65.5 |
| D488,402 S | * | 4/2004 | Fan | D11/164 |
| 7,000,351 B2 | * | 2/2006 | Baumann | 47/80 |
| 7,603,809 B2 | * | 10/2009 | Chen | 47/66.2 |
| 2005/0086863 A1 | * | 4/2005 | Brutsche et al. | 47/71 |

FOREIGN PATENT DOCUMENTS

| | | | |
|---|---|---|---|
| EP | 0 842 599 A1 | | 5/1998 |
| FR | 2565773 | * | 12/1985 |
| FR | EP 842599 | * | 1/1989 |

* cited by examiner

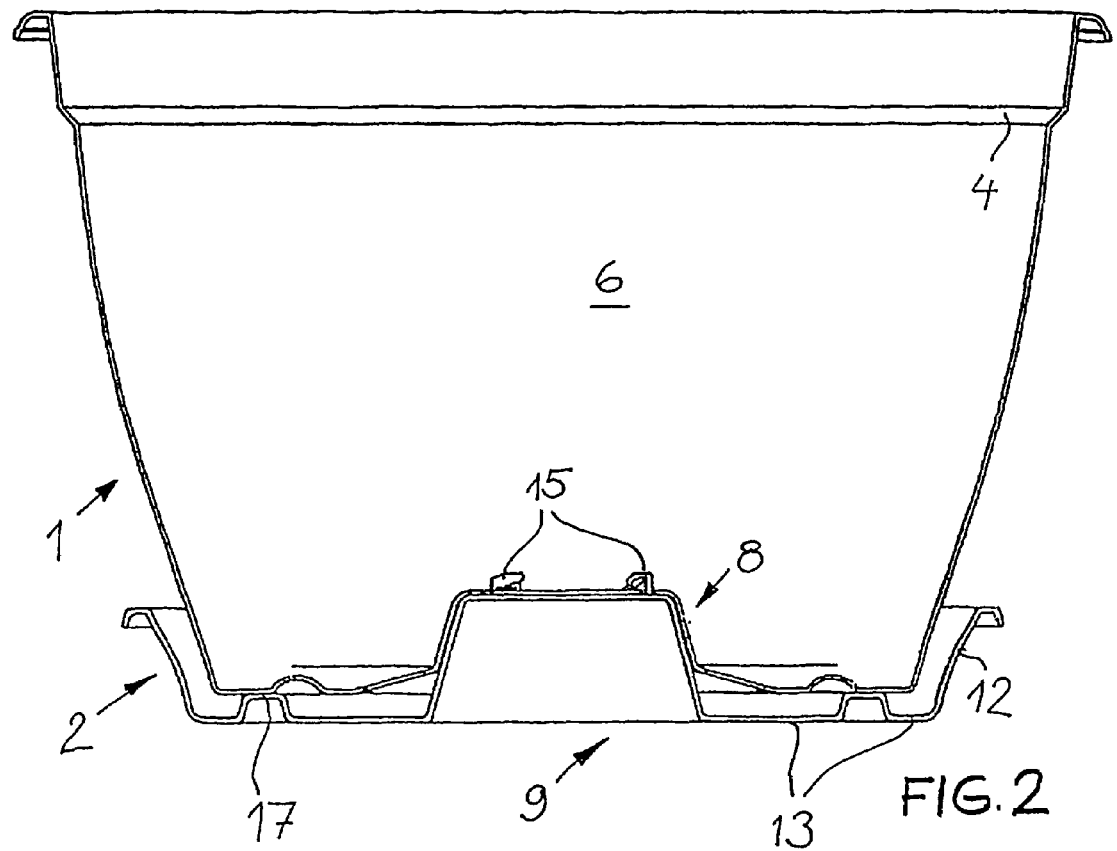
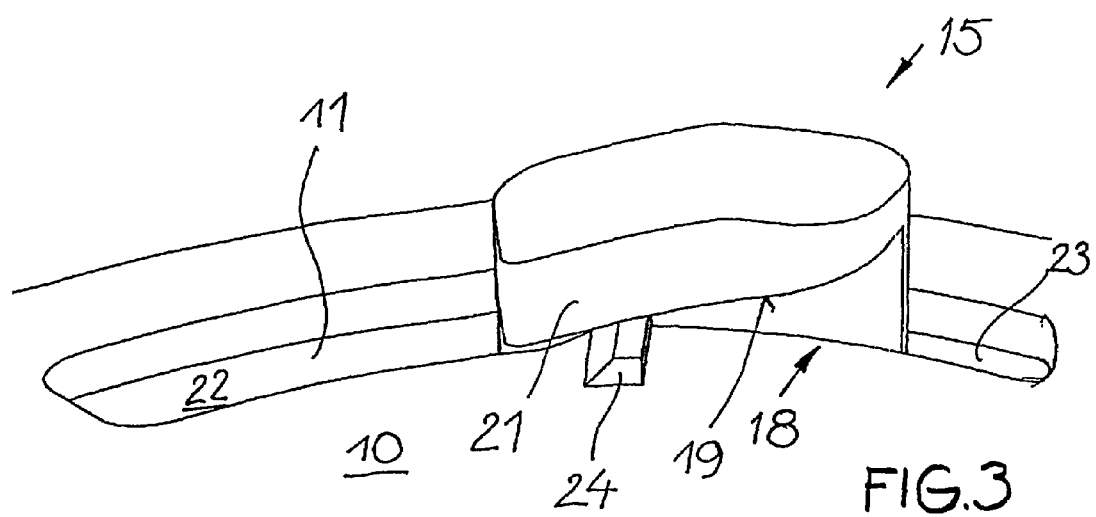

ized at the left to form the engagement area 22 by a narrowing 24.

PLANTER

This invention relates to a flowerpot or plant holder according to the preamble of Claim 1, such as that used in particular as a hanging basket-type flowerpot, where the coaster functions both as a water reservoir and also as protection from dripping water for living areas beneath the hanging basket. Essentially, however, coasters that can be attached to the pot can also be used either hanging or standing in some other way.

With traditional flowerpots of this type, snap connections in the form of hooks and holes are provided, requiring that the parts be aligned accurately. This is possible in general with visual control when the pot is not yet filled or when nothing is planted in it. In practice, commercial growers have mostly switched over to using pots without coasters and growing the plants in the pot until they are ready for market and only then attaching the coaster to a ready-to-sell product.

Accordingly, the object of this invention is to design a plant container of the type in question here so that the coaster can be connected to the pot easily in a "blind" maneuver, i.e., without looking inside the pot, in which case the pot must also be designed for an economical plant growing operation and the coaster is also to be connected so securely to the pot that it does not become detached easily, even when heavy root growth penetrates into the coaster.

According to this invention, this object is achieved with a flowerpot according to Claim 1. The design of guide surfaces for simple, rapid and reliable joining creates the prerequisite for handling that makes it possible to avoid errors that could otherwise lead to mistakes and damage due to incorrect joining or even problematical root growth. The transition from a simple connector-type movement to a rotational movement for the coupling engagement provides a high level of security that the connection between the pot and the coaster will not be lost simply due to the pressure of root growth.

With conical guide surfaces, preferably aligned rotationally symmetrically with a central axis of symmetry of the pot, bringing the pot and the coaster together as well as the actual joining operation have a joint and clear alignment. Essentially the lower pot area and/or the edge of the coaster is available as conical guide surfaces; these areas are traditionally designed with a conical taper and they have largely retained this basic shape because of the shaping conditions and for the purpose of stackability. However, a coaster which extends beyond the bottom pot area by a considerable radius is usually provided for flowerpots to permit a larger water reservoir and especially also to allow the water level to be seen. In such cases, direct contact guidance between the inside of the edge of the coaster and the bottom outside of the pot is out of the question. To bridge the distance, protruding guide elements may then be provided on the sides of the coaster but these cause problems from a technical as well as an aesthetic standpoint.

It appears to be easier and more convenient to provide the conical guide surfaces in the form of a dome on at least one side of the coaster or at the center of the pot. A guide face on one side may itself produce a corresponding centering effect when matching contact elements are arranged on the opposite side, e.g., three or more contact elements that engage with a conical guide face and are arranged in a circle. Preferably, however, a dome with a lateral surface in the form of a truncated cone is provided on both sides, i.e., on the side of the pot as well as on the side of the coaster, thus permitting a uniform guidance contact over the entire area.

After bringing the parts together in this way so that they are centered, a coupling connection is established by mutual twisting of the parts. Essentially a plurality of threaded or bayonet-type couplings may be considered for this purpose. For plant containers produced by injection molding, in particular hooked engagement with hook-shaped projections on one side and matching wall recesses on the other side may be used.

Figure 4:
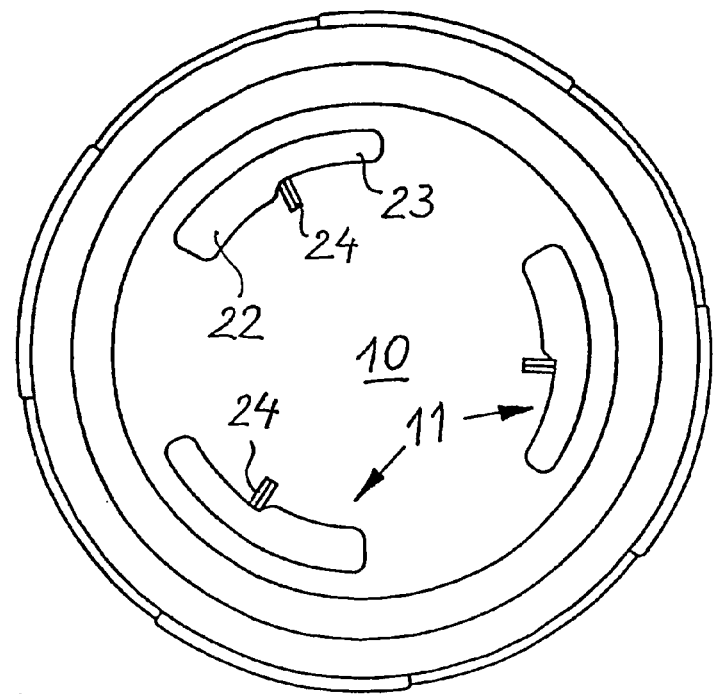
Figure 5:
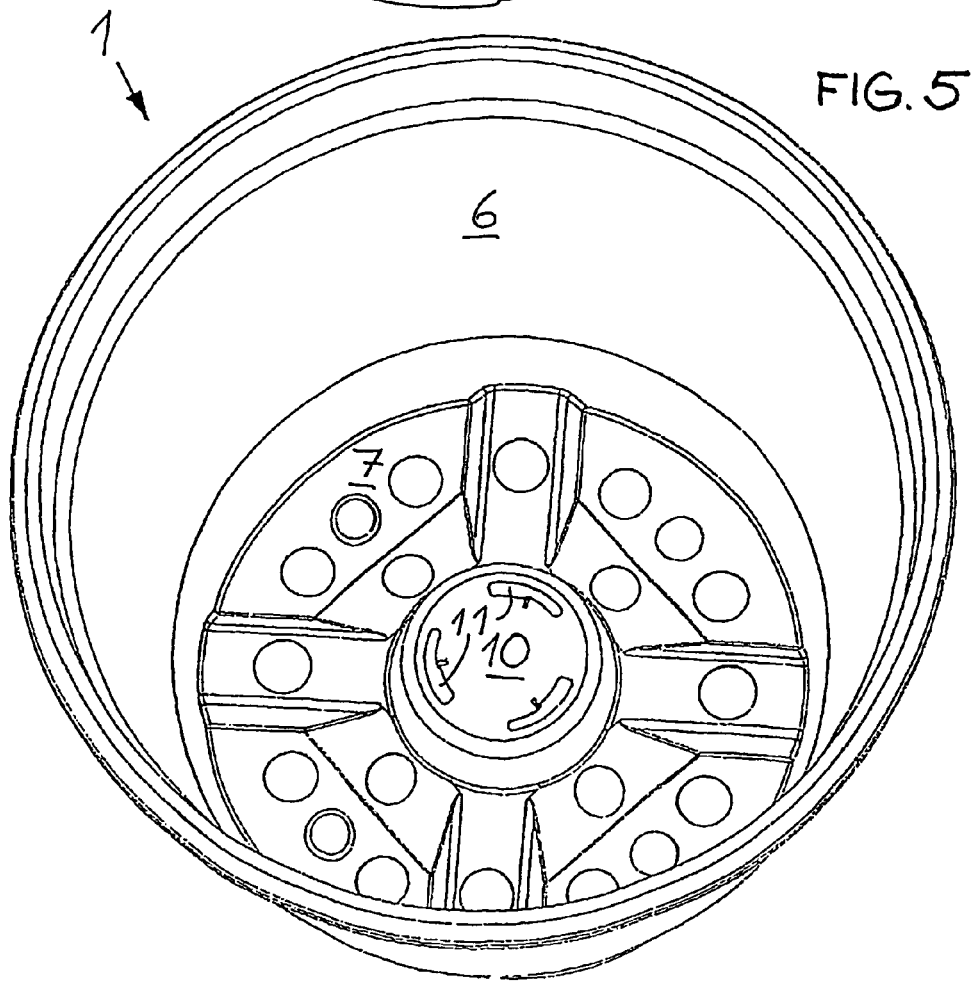
Figure 6:
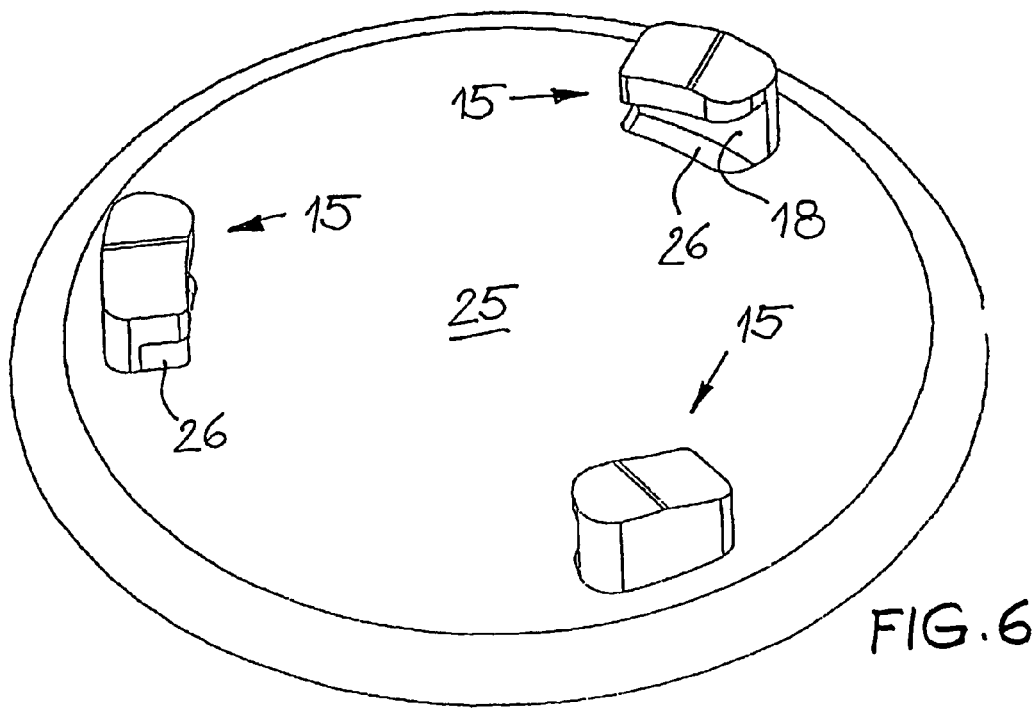
Figure 8:
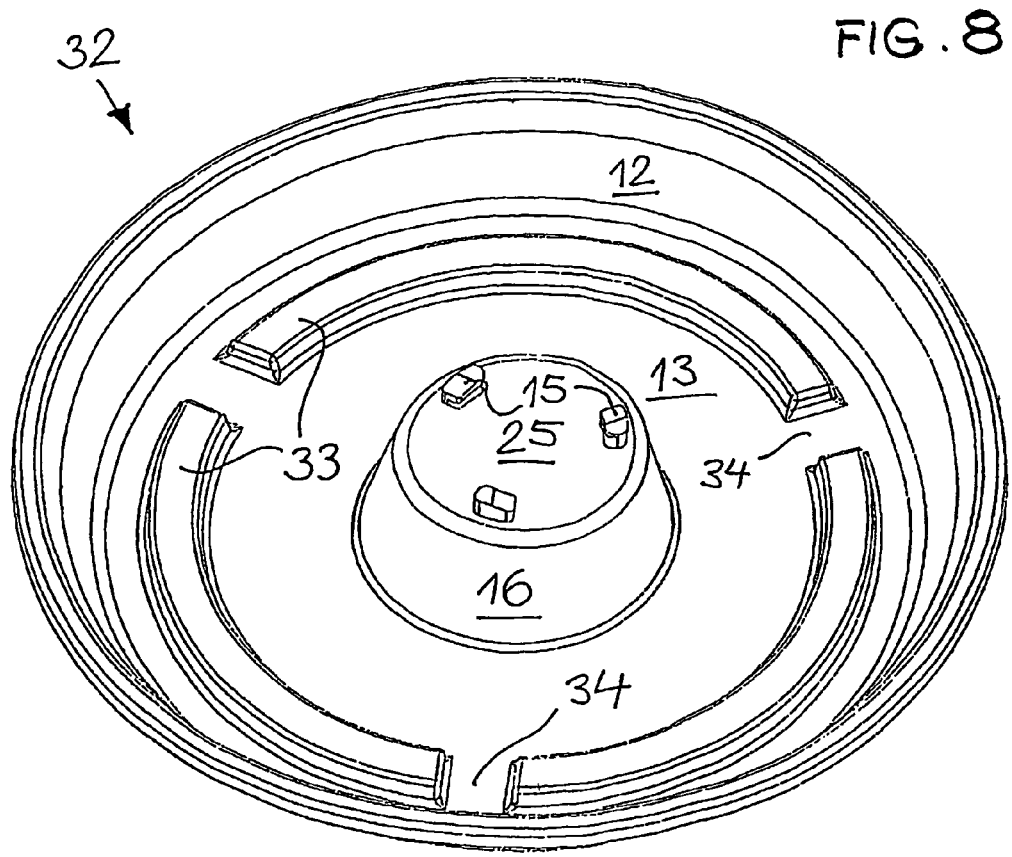
Figure 7:
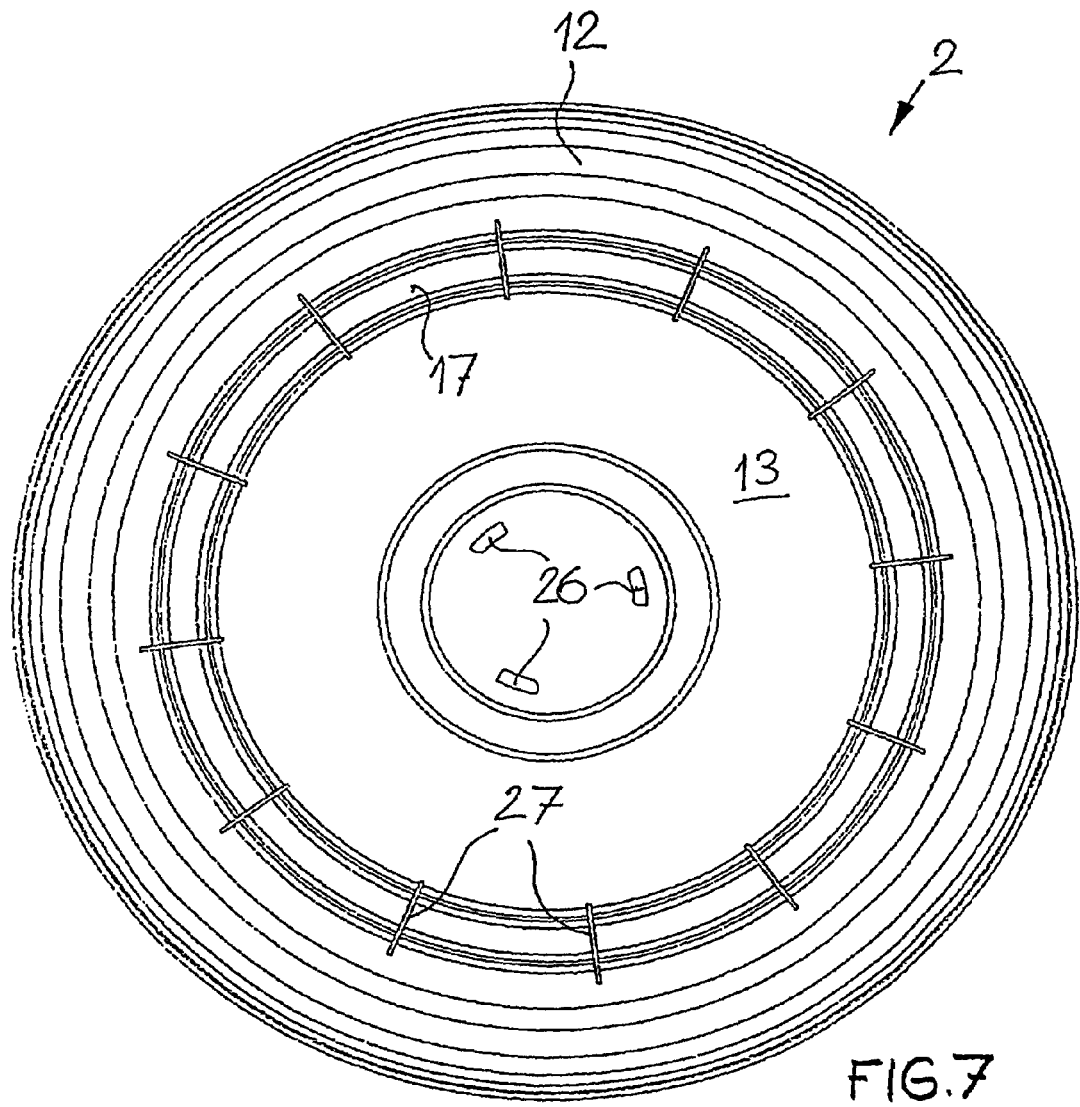

Exemplary embodiments of this invention are illustrated in the drawing and explained in greater detail below. In the drawings:

FIG. 1 shows an oblique view of a plant holder with the pot (one half) and a separate coaster, FIG. 2 shows a section through the plant container according to FIG. 1 with the coaster attached to the pot, FIG. 3 shows an enlarged detail from FIG. 2 in an oblique view, FIG. 4 shows a top view of a central (dome) area of the pot, FIG. 5 shows an oblique view into the pot from above, FIG. 6 shows an oblique view of a central area of the pot on an enlarged scale, FIG. 7 shows a view of the coaster from underneath, and FIG. 8 shows an oblique view of a modified embodiment of a coaster.

FIG. 1 shows a pot 1, one half of which is shown in the drawing to illustrate the inside of the pot and in particular the bottom area. A coaster 2 is provided for attachment to the pot 1. The pot 1 is produced by the injection molding method, for example, and has an edge 3 at the top designed for reinforcement in particular and two shoulders 4 and 5 on a conical side wall 6 and a highly profiled bottom area 7, which is designed with holes and ribs for a good drainage effect and optionally also for watering ("ebb and flow"?).

In deviation from traditional flowerpots of this type, the pot 1 has a dome 8 in the form of a truncated cone in the central bottom area, its conical side walls functioning as guide faces 9 and its end face 10 being designed with specially shaped holes 11 for a coupling engagement.

The coaster 2 is shown here with a flat basic shape in the form of a truncated cone with a peripheral edge 12 and a flat bottom 13 on the other side with a central dome 14 with hooks 15 protruding as coupling elements, while a conical jacket 16 serves as the guide face which cooperates with the interior guide face 9 of the dome 8 on the pot 1.

A peripheral hollow rib 17 also protrudes upward with respect to the flat bottom 13; when the coasters are stacked one inside the other for shipping, this hollow rib forms a spacer. The hollow rib 17 also functions as a spacer element with respect to the pot 1 when they are coupled together, in which case it is in contact with the bottom 7 of the pot 1 in an area near the edge according to FIG. 2 and secures the pot 1 and the coaster 2 with respect to one another.

As FIG. 2 also shows, the guide faces are in contact with one another when coupled together. Thus they simplify not only handling with joining them together without requiring any particular attention and without any particular trial and error and they are also supported on one another and thus achieve a mutual reinforcing effect.

In the enlarged oblique view according to FIG. 3, an area of the end face 10 of the dome 8 in the pot 1 can be seen with one of the three holes or slots 11 with a hook 15 passing through from the bottom, said hook being situated halfway between a through-hole position and a locked position on the right end of the slot 11. The hook 15 has a recess on its side situated toward the center of the end face 10 as a hook mouth 18 with a hook shoulder 19 above it, arranged beneath a head 21 which is widened with respect to the shaft 20 of the hook.

The slot 11 is at least slightly wider than the head 21 in its engagement area 22 which can be seen at the left of the drawing, whereas in a hook engagement area 23, it is somewhat broader at the right than the hook shaft 20 but is narrower than the hook head 21. This permits a conventional bayonet-type coupling connection. To facilitate the coupling movement, the hook shoulder 19 is designed with an inclination for sliding onto it, i.e., it is higher at the right and at the front in the direction of movement than at the left, so it can be engaged without applying pressure.

In the coupling movement, the hook 15 runs over a threshold-like catch element 24 with an inclined left front edge and a steep right rear edge, so that the engaged hook cannot become disengaged. In particular, care is taken to ensure that the pressure of the growing roots which could also move in a circle does not cause the coaster to become detached again.

It is self-evident that engagement for this purpose may be accomplished in various ways, e.g., also by a sawtooth profiling, preferably on both sides, of the abutting surfaces of the hook 15 and the end face 10. The front inclined surface of the catch element 24 could of course also run deeper into the enlarged area of the slot 11. In addition, the engaged position of the hook 15 at the right of the catch element 24 may be designed so that the shoulder surface 19 finds a large-area support.

With a spherical catch of a given height, an essentially detachable but adequately secure coupling that is thus secured against detachment is provided.

Depending on the individual conditions of the pot design, the shaping option and in particular the unmolding, there are various alternatives for such a hook engagement. A hook mouth may easily be designed so that the slot becomes narrower from a push-through opening on both sides. The hook mouth may also be positioned on the outside radially so that loads can be applied to the inclined surfaces of the dome 8 by a shorter route. In another embodiment, the anchoring holes in the pot may have a roof-top or be partially covered to prevent them from becoming clogged due to roots.

A very narrow hook—without the widened hook head—is also possible in combination with a very narrow slot by the fact that the hook mouth is shifted forward in the coupling direction so that the hook engages extends beyond the end of the slot. This design is also by no means limited to the hooks being arranged on the top side of the coaster dome 14. This arrangement may also be reversed, with the hooks being on the bottom of the pot dome 8. In the case of a coaster dome 14 which is designed to be at least as high as the edge 12, hook openings are also easily provided in the end face without any concern about water escaping at this point.

As in the present case, it may also be self-evident to provide perforations in the wall in the hook area. FIG. 6 shows an end face 25 of the dome 14 of the coaster 2 with the three above-mentioned hooks 15 which are distributed uniformly on their circumference at the edge—like the slots 11 in the dome 8 of the pot. Beneath the respective hook mouth 18, the end face 25 has a recess 26 which facilitates unmolding of the coaster from its injection mold. The mold for the coaster extends from the bottom through the area of the end face 25, extending into the area of the hook mouth, and the shaping of the hook shoulder 19 there. After molding, the workpiece can be ejected in the axial direction across the end face 25, whereas unmolding of the hook with the end face 25 closed would presuppose a rotational movement for unmolding.

These recesses 26 can be seen from beneath in FIG. 7. In addition, the area of the hollow rib 17 can be seen in the view from beneath, its ring-shaped hollow form being interrupted at short intervals by webs 27 which at least mostly cut off the cross section. These webs complete the spacing function of the hollow rib 17 mentioned above by preventing the hollow ribs from mutual penetration when the pots are stacked and thus precluding a nonspecific stacking distance and the risk of jamming of the pots.

An alternative embodiment of a coaster 32 according to FIG. 8 is obtained from the fact that the spacer element provided here is not a peripheral hollow rib but instead pieces of hollow rib sections 33 are provided. Interruptions 34 in between permit an exchange of water between the inner and outer bottom areas on both sides of the spacer elements 33 and optionally also an additional space for roots to grow through. It is self-evident that these ring sections 33 on the bottom side must also be secured against sticking when the pots are stacked together when they are designed to be hollow on the bottom side according to the new or thin-wall shaping. In each ring section one or more transverse webs may be sufficient to secure the pots. The ring sections may also be replaced by a circle or a grid of hollow nubs, which then serve the same purpose.

It is self-evident that the coupling elements need not necessarily be connected to the centering elements. For example, if centering elements are provided on the pot and coaster like the two central domes in the present case, coupling elements may be arranged farther toward the edge to obtain a securing effect distributed in the base area. For example, spacer elements of the type described here may be provided with hook elements which engage in holes in the bottom of the pot.

The invention claimed is:

1. Plant container comprising:
a pot (1) and a coaster (20) made of plastic;
wherein the coaster (2) is closed at the bottom and serves as a water dish detachably attached by coupling elements to the pot (1);
wherein the pot is provided with holes on the bottom for drainage of water from the pot to the coaster;
wherein the pot (1) has a dome (8) in the form of a truncated cone forming a guide surface (9) tapering in conical shape;
wherein the guide surface of the pot is aligned rotationally symmetrical about a central axis of symmetry of the pot;
wherein the coaster (2) has a dome (14) in the form of a truncated cone forming a guide surface (16) tapering in conical shape;
wherein the guide surface of the coaster is aligned rotationally symmetrical about a central axis of symmetry of the coaster;
wherein the guide surface of the coaster is engaged with the guide surface of the pot so that the central axis of symmetry of the coaster is both aligned and parallel with the central axis of symmetry of the pot and the coaster is rotatable relative to the pot about the central axis of symmetry of the pot;
wherein the coupling elements (11, 15) include a plurality of openings spaced about the central axis of symmetry of the pot and a plurality of hooks cooperating with the openings to form a bayonet coupling; and
wherein the bayonet coupling is adapted so that each of the hooks are axially inserted and withdrawn from a first portion of the openings without deformation of the openings or the hooks and rotated about the central axis of symmetry of the pot from the first portion of the openings to a second portion of the openings from which the hooks cannot be axially withdrawn from the openings to couple the coaster and the pot against relative axial movement therebetween;
wherein the domes are provided with the coupling elements.

2. Plant container according to claim 1, wherein the coupling elements are designed in the form of the hooks (15) on the coaster and the openings (11) in the pot.

3. Plant container according to claim 2, wherein the hooks (15) are designed so that they protrude upward on an end face of the dome of the coaster (2) and the openings (11) are provided in an end face (10) of the dome of the pot (1), the hooks (15) engaging the openings in coupling engagement with mutual rotation.

4. Plant container according to claim 3, wherein the hooks (15) have a hook mouth (18) pointing in the radial direction on at least one side.

5. Plant container according to claim 4, wherein the openings (11) are designed with a width that narrows in the direction of rotation in the manner of a keyhole.

6. Plant container according to claim 5, wherein the coupling elements are secured by catch elements (24) having inclined edges engaged by the hooks to secure the hooks in the second portion of the openings.

7. Plant container according to claim 6, wherein the dome (14) of the coaster protrudes upward above an edge (12) of the coaster.

8. Plant container according to claim 7, wherein the coaster (2) is provided with at least one spacer element (17) with respect to the pot (1).

9. Plant container according to claim 8, wherein the spacer element (17) is designed with a ring shape in the coaster (2).

10. Plant container according to claim 9, wherein the spacer element includes an interrupted row of ring sections (33).

11. Plant container according to claim 9, wherein the spacer element (33) includes a hollow rib which is open at the bottom and whose hollow space is subdivided by at least one web.

12. Plant container according to claim 1, wherein the coupling elements are secured by catch elements (24) having inclined edges engaged by the hooks to secure the hooks in the second portion of the openings.

13. Plant container according to claim 1, wherein the dome (14) of the coaster protrudes upward above an edge (12) of the coaster.

14. Plant container according to claim 1, wherein the coaster (2) is provided with at least one spacer element (17) with respect to the pot (1).

15. Plant container according to claim 1, wherein the openings (11) are designed with a width that narrows in the direction of rotation in the manner of a keyhole.

* * * * *